United States Patent Office 3,349,570
Patented Oct. 31, 1967

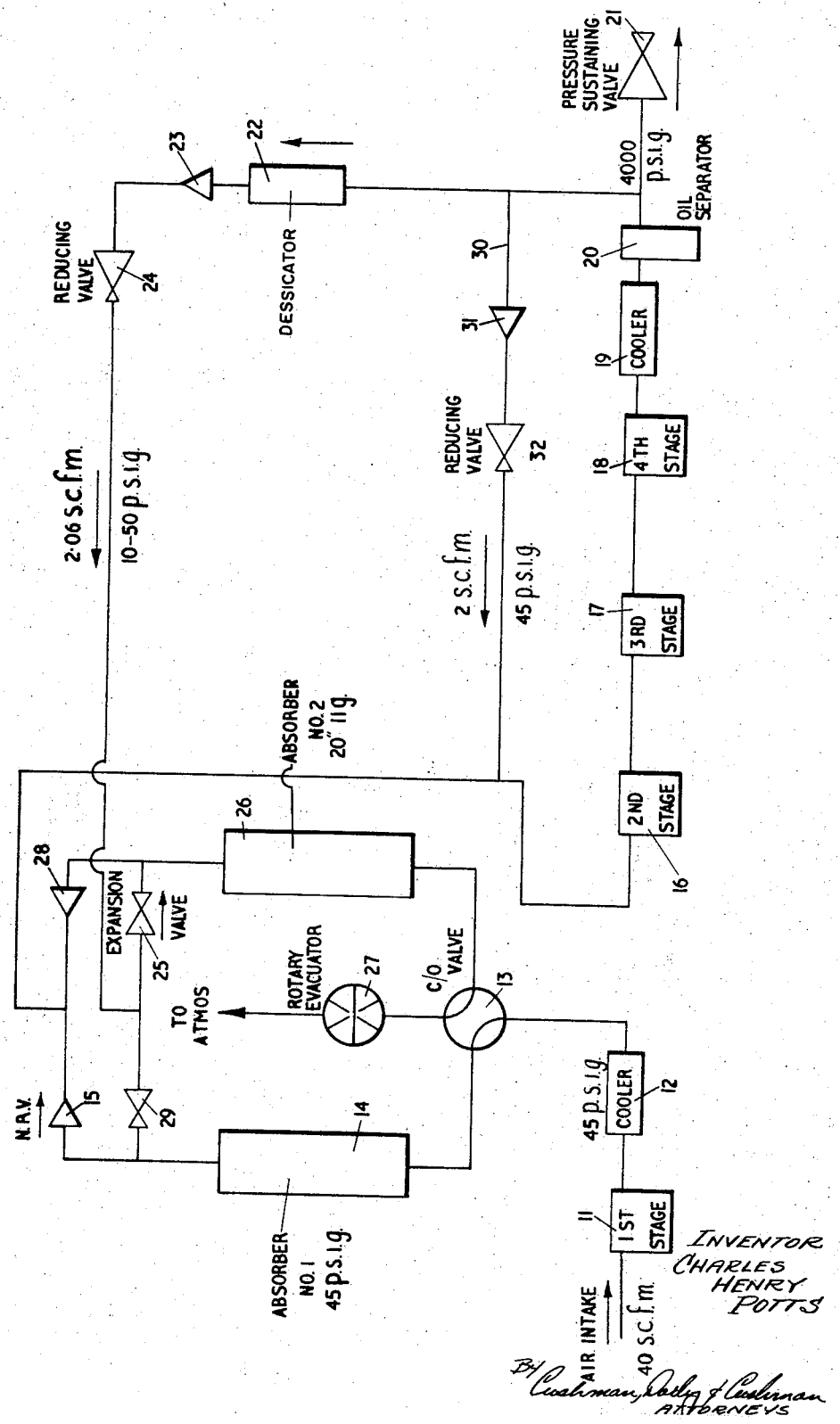

3,349,570
ADSORPTIVE REMOVAL OF CONTAMINANTS
FROM COMPRESSED GAS MIXTURE
Charles Henry Potts, West Ewell, England, assignor to
Dryvent Limited, London, England, a British company
Filed Feb. 1, 1965, Ser. No. 429,592
Claims priority, application Great Britain, Feb. 4, 1964,
4,683/64
9 Claims. (Cl. 62—18)

ABSTRACT OF THE DISCLOSURE

For producing dry highly compressed, gas, a multi-stage compressor having a plurality of compression stages through which gas is fed successively, drying equipment comprising one drying element or a plurality of drying elements, selective for the water component in the gas, means for applying to said one drying element or selectively to each of the plurality of drying elements gas from the output of one of the compression stages to produce at an outlet of the said one element or selected element a dried gas product for application to the next compression stage to said one drying element at a time when the supply of gas thereto is cut off or to one of the said plurality of drying elements at a time when the latter is not in use, said feedback line including a drying element and an expansion valve to produce dried and expanded feedback gas, and a rotary evacutor for discharging dried and expanded feedback gas from the said one element or the said one of the plurality of drying elements together with the adsorbed water component.

To prevent imbalance in the gas flow between the compressor first and subsequent stages during changeovers between the drying elements, a second feedback line is interposed between the high pressure output of the compressor and the input to the second stage, this line including a non-return valve and a pressure reducing valve arranged to provide feedback gas equivalent to the output pressure of the first stage.

The foregoing abstract is not intended to be a comprehensive discussion of all of the principles, possible modes or applications of the invention disclosed in this document and should not be used to interpret the scope of the claims which appear at the end of this specification.

The present invention relates to methods of and apparatus for fractionating gaseous mixtures and is particularly though not exclusively concerned with the production of dry highly compressed air.

It is common practice in the production of dry highly compressed air to employ a multi-stage air compressor followed by air-drying equipment for drying the air delivered by the final stage of the compressor. Such an arrangement, however, necessitates the use of a robust form of drying equipment which will withstand the high air pressures developed and the cost of the equipment is therefore high. Hitherto, it has been considered unsatisfactory to dry the air in the early stages of compression for the reason that subsequent compression of the partially dried air results in an undesirable increase in dew point. To produce satisfactory results by drying the air in the early stages of compression it would be necessary to provide highly efficient drying and it is one object of the present invention to provide in multi-stage air compression a drying process having an efficiency higher than that obtainable by existing processes.

According to one aspect of the present invention, there is provided a method of producing dry highly compressed gas, comprising feeding the gas through a succession of compression stages in a multi-stage compressor, whilst subjecting the gas passing between one of the stages and the next to a drying process, said drying process comprising the steps of applying the gas to be dried under pressure to an inlet of a first drying element which is selective for the water component of the gas to produce at an outlet thereof a dried gas product, feeding to said element at a time when the supply of gas thereto is cut off or to a further drying element at a time when the latter is not in use feedback gas obtained from the output of a subsequent compression stage in the multi-stage compressor after passing said feedback gas through an auxiliary drying element and subsequently subjecting it to expansion, and discharging the dried and expanded feedback gas from the said first element or said further element together with the water component therefrom.

Further, according to the said one aspect of the present invention, there is provided in apparatus for producing dry highly compressed gas comprising a multi-stage compressor having a plurality of compression stages through which gas is fed successively, drying equipment comprising one drying element or a plurality of drying elements, selective for the water component in the gas, means for applying to said one drying element or selectively to each of the plurality of drying elements gas from the output of one of the compression stages to produce at an outlet of the said one element or selected element a dried gas product for application to the next compression stage, a feedback line for feeding back a portion of the gas delivered by a subsequent compression stage to said one drying element at a time when the supply of gas thereto is cut off or to one of the said plurality of drying elements at a time when the latter is not in use, said feedback line including a drying element and an expansion valve to produce dried and expanded feedback gas, and means for discharging the dried and expanded feedback gas from the said one element or the said one of the plurality of drying elements together with the absorbed water component.

It has hitherto been proposed to employ air-drying apparatus in which air to be dried is passed through one drying element for a predetermined time whilst another drying element is being reactivated and then to switch over the apparatus so that the air passes through the reactivated element whilst the element previously employed for drying is subjected to a reactivating treatment. Preferably, drying apparatus of this kind is employed in the method according to the invention.

In one specific arrangement of the hitherto proposed air-drying apparatus, air is passed under pressure through one drying element and a portion of the pressurised dry air is fed back though an expansion valve to the element to be reactivated so that it serves to pick up moisture in the latter element and pass it to atmosphere. After a predetermined time the apparatus is switched over so that pressurised air is dried in the reactivated element and a portion of the dry pressurised air therefrom is fed back through the expansion valve to the other element from which it passes to atmosphere.

It has been found that in the hitherto proposed drying apparatus above described it is necessary to operate the apparatus at a relatively high input pressure so as to produce by expansion of the feedback air the required conditions for drying the element to be reactivated and it is an object of another aspect of this invention to provide a method of and apparatus for fractionating gaseous mixtures or drying air under relatively low input pressures.

According to a second aspect of the present invention, there is provided a method of fractionating a gaseous mixture comprising the steps of applying gaseous mixture under pressure from a supply to a first adsorbent element which is selective for a component of said mixture to produce therefrom a primary product, subjecting a portion of said primary product to compression to produce a compressed feedback portion, feeding said compressed feedback portion through an auxiliary adsorbent element, which is selective for said component to produce a modified feedback portion, subsequently expanding the modified feedback portion and applying it to said first adsorbent element at a time when the supply of gaseous mixture thereto is cut-off or to a further adsorbent element at a time when the latter is not in use to produce a secondary product, and discharging from said first adsorbent element or said further adsorbent element the said secondary product. Preferably, the feedback portion of said primary product is withdrawn under a pressure less than atmospheric pressure.

One embodiment of the invention will now be described by way of example with reference to the accompanying drawing which is a schematic block diagram of a multistage air compressor embodying drying equipment in accordance with the invention.

Referring to the drawing, air at 40 s.c.f.m. is fed to a first compression stage 11 in which it is compressed to 45 p.s.i.g. and from which it is fed through a cooler 12 to a four-way cut-off valve 13. In the position shown, the valve 13 directs the compressed air to an adsorber element 14 where it is dried. The dried air from the adsorber element 14 is fed via a non-return valve 15 to a second compression stage 16 where it is further compressed and from which it is then fed through two further compression stages 17 and 18. From the final compression stage 18 the highly compressed air is fed via a cooler 19 and an oil separator 20 to a pressure-substaining outlet valve 21. The compression stages 11, 16, 17 and 18 are such as to produce at the output of the final stage 18 air at a pressure of 4,000 p.s.i.g. and a portion of this highly compressed air is fed to a small desiccant charged initiator 22 where its dewpoint is reduced to say minus 40° F. at 4,000 p.s.i.g. The feedback air from this initiator 22 is fed through a non-return valve 23 to a pressure-reducing valve 24 where it is expanded to a pressure of between 10 and 50 p.s.i.g. with a resulting fall in dew-point level.

With the four-way cut-off valve 13 set in the position shown, the expanded feedback air from the valve 24 passes through an expansion valve 25 into a further absorber element 26, which it reactivates and from which it is withdrawn via the cut-off valve 13 by a rotary evacuator 27 which exhausts it to atmosphere at a pressure of 20″ Hg, thereby reducing the dew-point to approximately −308° F. The air in passing back through the adsorber element 26 reactivates the latter and conditions it at this dew-point level so that when the cut-off valve 13 changes over, air will leave the outlet of the adsorber element 26 at a dew-point approaching this figure. The lowering of the dew-point level is progressive, the system giving drier and drier air as time passes. It is found unnecessary to remove or reactivate the initiator 22 as this gradually reactivates itself as the high pressure air becomes drier.

The four-way cut-off valve 13 is arranged to be switched periodically by a short cycle timer unit of well known kind, but may if desired be switched by connection via a gear train to the main shaft of the compressor. When the valve 13 switches over from the position shown to its alternative position air from the cooler 12 passes through the absorber element 26 and a further non-return valve 28 to the second compression stage 16, and under these conditions feedback air is fed to the adsorber element 14 through an expansion valve 29.

In order that no out-of-balance exists in the air flow between the first and second stages 11 and 16 at the changeover of valve 13 a second feedback line 30 is incorporated between the high pressure output of the compressor and the input to the second stage 16, the line 30 including a non-return valve 31 and a pressure reducing valve 32 arranged to provide feedback air at a pressure of 45 p.s.i.g.

What I claim as my invention and desire to secure by Letters Patent is:

1. A method of fractionating a gaseous mixture comprising the steps of applying gaseous mixture under pressure from a supply to a first adsorbent element which is selective for a component of said mixture to produce therefrom a primary product, subjecting a portion of said primary product to compression to produce a compressed feedback portion, feeding said compressed feedback portion through an auxiliary adsorbent element, which is selective for said component to produce a modified feedback portion, subsequently expanding the modified feedback portion and applying it to said first adsorbent element at a time when the supply of gaseous mixture thereto is cut-off to produce a secondary product, and discharging from said first adsorbent element the said secondary product.

2. The method of claim 1 further comprising providing a further adsorbent element; applying said gaseous mixture under pressure to an inlet of the first-mentioned adsorbent element; applying the expanded, modified feedback portion to an outlet of the further adsorbent element during predetermined time periods, alternating with immediately succeeding, equal time periods for which the gaseous mixture under pressure is applied to an inlet of the further adsorbent element and the expanded, modified feedback portion is fed back to the outlet of the first-mentioned adsorbent element; and withdrawing said feedback portion from the first-mentioned and further adsorbent elements under a pressure less than atmospheric pressure.

3. A method of producing a dry, highly compressed gas, comprising: (a) compressing the gas an increment; (b) absorbing water from the gas compressed said increment onto a body of adsorbent material; (c) compressing the dried gas a further increment; (d) splitting a feedback gas stream from the further compressed gas; (e) further drying the feedback gas; (f) expanding the feedback gas; (g) isolating the gas compressed the first-mentioned increment from said body of adsorbent material; (h) contacting the body of adsorbent material with the further dried, expanded feedback gas stream, regenerating the body of adsorbent material; and (i) discharging the further dried, expanded feedback gas stream after step (h).

4. The method of claim 3 further comprising (j) adsorbing water from succeeding quanta of the isolated gas compressed the first-mentioned increment onto a second body of adsorbent material during steps (g) and (h) and conducting steps (c) through (f) thereupon;

(k) isolating succeeding quanta of the gas compressed the first-mentioned increment from the second body of adsorbent material, and conducting step (a) thereupon on succeeding quanta of the gas; while (l) contacting the second body of adsorbent material with the further dried, expanded feedback gas stream, regenerating the second body of adsorbent material;

(m) discharging the further dried, expanded feedback gas stream after step (l); and (n) continuing the method alternately adsorbing water upon, and regenerating, the bodies of adsorbent material.

5. The method of claim 4 further comprising (o) withdrawing from the bodies of adsorbent material at a pressure less than atmospheric pressure, the further dried, expanded gas stream being discharged in steps (i) and (m).

6. Apparatus for producing dry highly compressed gas comprising a multi-stage compressor having a plurality of compression stages through which gas is fed successively, drying equipment comprising at least one adsorbent type drying element, selective for the water component in the gas, means for selectively applying to each drying element gas from the output of one of the compression stages to produce at an outlet of the said selected drying element a dried gas product for application to the next compression stage, a feedback line for feeding back a portion of the gas delivered by a subsequent compression stage of said compressor to said selected drying element at a time when the supply of gas thereto is cut-off, said feedback line including a drying element and an expansion valve to produce dried and expanded feedback gas, and means for discharging the dried and expanded feedback gas from the said selected drying element together with the adsorbed water component.

7. Apparatus according to claim 6, wherein a further adsorbent-type drying element is provided, and wherein the apparatus includes a valve and a pump, said valve having two conditions in a first of which it feeds the gas from the said one of the stages to an inlet of the first mentioned drying element and connects an inlet of the further drying element to the suction side of the pump and in a second of which it feeds the gas from the said one of the stages to an inlet of the further drying element and connects the inlet of the first element to the suction side of the pump.

8. Apparatus according to claim 7, wherein a second feedback line is provided between the output of the final stage of the compressor and the input to the second stage, in order to reduce any out-of-balance produced in the air supply between the first and second stages at the changeover of the valve.

9. Apparatus for fractionating a gaseous mixture comprising a first adsorbent element, supply means for supplying said gaseous mixture under pressure to said first adsorbent element which is selective for a component of said mixture to produce at the output thereof a primary product, means for subjecting a portion of said primary product to compression to produce a compressed feedback portion, means for feeding said compressed feedback portion through an auxiliary adsorbent element which is selective for said component to produce a modified feedback portion, means for subsequently expanding the modified feedback portion and applying it to said first adsorbent element at a time when the supply of gaseous mixture thereto is cut-off when the latter is not in use to produce a secondary product, and means for discharging said secondary product from said adsorbent element.

References Cited

UNITED STATES PATENTS

| | | | |
|---|---|---|---|
| 1,831,644 | 11/1931 | Adair et al. | 62—18 X |
| 2,089,558 | 8/1937 | Karwat | 62—12 |
| 2,363,273 | 11/1944 | Waterfill | 62—196 X |
| 2,503,939 | 4/1950 | De Baufre | 62—18 X |
| 2,737,784 | 3/1956 | Becker et al. | 62—38 |
| 2,763,138 | 9/1956 | Tsunoda | 62—13 |
| 2,793,507 | 5/1957 | Hnilicka | 62—18 X |
| 2,827,775 | 3/1958 | Linde | 62—13 |
| 2,840,994 | 7/1958 | Lobo | 62—18 X |

NORMAN YUDKOFF, *Primary Examiner.*

V. W. PRETKA, *Assistant Examiner.*